United States Patent [19]

Wang et al.

[11] Patent Number: 4,585,838

[45] Date of Patent: Apr. 29, 1986

[54] PROCESS FOR PREPARING EPOXY RESINS CONTAINING LOW LEVELS OF TOTAL HALIDE

[75] Inventors: Chun S. Wang, Lake Jackson; Robert L. Bowden, Angleton; Wuu N. Chen, Lake Jackson, all of Tex.

[73] Assignee: The Dow Chemical Company, Midland, Mich.

[21] Appl. No.: 773,500

[22] Filed: Sep. 9, 1985

Related U.S. Application Data

[63] Continuation-in-part of Ser. No. 762,971, Aug. 6, 1985, abandoned, which is a continuation-in-part of Ser. No. 672,775, Nov. 19, 1984, abandoned.

[51] Int. Cl.$^4$ .............................................. C08G 59/14
[52] U.S. Cl. .................................... 525/507; 525/523; 528/489; 528/87; 549/517; 549/541
[58] Field of Search ................... 525/507, 523; 528/87, 528/489; 549/517, 541

[56] References Cited

U.S. PATENT DOCUMENTS

| | | | |
|---|---|---|---|
| 2,658,885 | 11/1953 | D'Alelio | 528/107 |
| 2,848,435 | 8/1958 | Griffin et al. | 528/95 |
| 2,943,095 | 6/1960 | Farnham et al. | 549/517 |
| 3,121,727 | 2/1964 | Baliker et al. | 549/517 |
| 4,447,598 | 5/1984 | Caskey et al. | 528/489 |
| 4,485,221 | 11/1984 | Krueger et al. | 525/507 |

FOREIGN PATENT DOCUMENTS 2120659 12/1983 United Kingdom .

*Primary Examiner*—Earl Nielsen
*Attorney, Agent, or Firm*—J. G. Carter

[57] ABSTRACT

The total halide content of epoxy resins is reduced by heating a resin containing halide dissolved in a solvent mixture containing at least one ketone, at least one aromatic hydrocarbon and optionally at least one compound containing at least one aliphatic hydroxyl group in the presence of an alkali metal hydroxide for a time sufficient to reduce the total halide content.

10 Claims, No Drawings

PROCESS FOR PREPARING EPOXY RESINS CONTAINING LOW LEVELS OF TOTAL HALIDE

CROSS REFERENCE TO RELATED APPLICATION

This application is a continuation-in-part of copending application Ser. No. 762,971 filed Aug. 6, 1985 abandoned which is a continuation-in-part application of copending application Ser. No. 672,775 filed Nov. 19, 1984 abandoned.

BACKGROUND OF THE INVENTION

The present invention pertains to a method for reducing the hydrolyzable and bound (total) halide content of an epoxy resin.

Epoxy resins are used in the electronics industry as encapsulants, potting compounds, electrical laminates and the like. This industry has discovered that the halide content of the epoxy resin adversely affects the electrical properties of the resultant end products. The higher the halide content, the greater the detriment. The present invention provides a method for reducing the total (hydrolyzable and bound) halide content of epoxy resins.

SUMMARY OF THE INVENTION

The present invention pertains to a method for reducing the total halide content of an epoxy resin which method comprises heating said epoxy resin which has been dissolved in a solvent system comprising from about 25 to about 75, preferably from about 50 to about 75, percent by weight of a ketone and from 75 to about 25, preferably from about 50 to about 25 percent by weight of an aromatic hydrocarbon in the presence of (A) from about 0.1 to about 5, preferably from about 0.2 to about 1 percent by weight based upon the weight of said epoxy resin of at least one cosolvent having at least one aliphatic hydroxide per molecule and (B) from about 0.25 to about 10, preferably from about 1 to about 5, most preferably from about 1 to about 3 moles of an alkali metal hydroxide per equivalent of total halide at a temperature and for a time sufficient to reduce the total halide content of said epoxy resin and thereafter recovering the resultant epoxy resin.

Another aspect of the present invention is a process for reducing the total halide content of an epoxy resin containing hydrolyzable and/or bound halide which process comprises (A) dissolving said epoxy resin in a solvent system which comprises
  (1) from about 25 to about 75, preferably from about 50 to about 75 percent by weight of at least one ketone and
  (2) from about 75 to about 25, preferably from about 50 to about 25 percent by weight of at least one aromatic hydrocarbon;
(B) adding from about 0.1 to about 5, preferably from about 0.2 to about 1 percent by weight based upon the weight of said epoxy resin of at least one compound having at least one aliphatic hydroxyl group per molecule as a cosolvent;
(C) heating the resultant solution to a temperature of from about 50° C. up to about 200° C.;
(D) adding from about 0.25 to about 10, preferably from about 1 to about 5, most preferably from about 1 to about 3 moles of an alkali metal hydroxide per equivalent of total halide;
(E) continuing the heating for a time sufficient to reduce the total halide content of said epoxy resin;
(F) washing the product from step (E) with either water, a dilute aqueous solution of a weak inorganic acid, acid salt or a combination thereof; and
(G) recovering the resultant epoxy resin having a reduced total halide content from the product of step (F).

DETAILED DESCRIPTION OF THE PRESENT INVENTION

Suitable epoxy resins which can be employed herein include any epoxy resin containing an average of more than one vicinal epoxy group per molecule and which contains an undesirable quantity of total, hydrolyzable and/or bound halide.

Particularly suitable epoxy resins include the polyglycidyl ether of compounds having an average of more than one hydroxyl group per molecule and which contains at least about 10 parts per million total halide such as, for example, glycidyl ethers of bisphenols, glycidyl ethers of phenol formaldehyde epoxy resins, cresol formaldehyde epoxy resins, mixtures thereof and the like.

Suitable ketones which can be employed herein include acetone, methyl ethyl ketone, methyl isobutyl ketone, cyclohexanone, mixtures thereof and the like.

Suitable aromatic hydrocarbons which can be employed herein include benzene, toluene, xylene, mixtures thereof and the like.

Suitable compounds having at least one aliphatic hydroxyl group per molecule include, for example, aliphatic alcohols, diols and triols and polyoxyalkylene compounds having from 1 to about 3 hydroxyl groups per molecule having an average molecular weight of from about 100 to about 600, preferably from about 200 to about 400, mixtures thereof and the like.

Particularly suitable are the polyoxyethylene glycols sometimes referred to as polyethylene glycols, mixtures thereof and the like.

Suitable alkali metal hydroxides include, for example, sodium hydroxide, potassium hydroxide, lithium hydroxide, mixtures thereof and the like. The alkali metal can be employed in solid form or as an aqueous solution, preferably as an aqueous solution in a concentration of from about 10 to about 70, preferably from about 40 to about 60 percent alkali metal hydroxide by weight.

The heating can be conducted at atmospheric or superatmospheric pressure. When relatively low boiling solvents are employed, superatmospheric pressure is usually required. It is preferred to employ a temperature of from about 50° C. up to 200° C., more preferably from about 100° to about 130° C. It is preferable to not employ a temperature above the boiling point of the solvent system. For low boiling solvent systems, pressure can be employed so that temperatures above the boiling point can be employed.

When washing the epoxy resin to remove the salt formed and any unreacted alkali metal hydroxide, it is preferred to employ a plurality of washing steps employing as the first wash a dilute solution of an inorganic acid or a dilute solution of an inorganic acid salt, preferably acids or acid salts having a pKa value of from about 2 to about 10, preferably from about 2 to about 7.

Suitable acids and acid salts include, for example, phosphoric acid, mono-sodium phosphate, di-sodium phosphate, carbonic acid, boric acid, mixtures thereof and the like.

The epoxy resin is ultimately recovered by subjecting the organic phase from the washing procedure to distillation to remove the solvents from the epoxy resin.

The following examples are illustrative of the present invention, but are not to be construed as to limiting the scope thereof in any manner.

EXAMPLE 1

75 g of a cresol-formaldehyde epoxy novolac resin having an average epoxide equivalent weight (EEW) of about 220 and an average epoxy functionality of about 6 containing 3536 ppm hydrolyzable chloride by weight was dissolved in 75 g of a 75/25 by weight mixture of methyl ethyl ketone (MEK) and toluene. 0.38 g (0.5 wt.% based on epoxy resin) of polyethylene glycol having an average molecular weight of about 400 was added to the solution and the solution was heated to 80° C. with stirring. 1.05 g of 50% aqueous potassium hydroxide (1.25 eq. KOH to 1 eq. of hydrolyzable chloride) was added all at once and the reaction mixture was maintained at 80° for 2 hours (7200 s) with good agitation.

The reaction mixture was diluted to 20% resin concentration with MEK/toluene solvent mix, neutralized with dilute $H_3PO_4$ and then washed with water 3 to 4 times to remove NaCl.

The organic phase from the water washes was placed on a rotary evaporator under a full vacuum and 170° C. to remove the solvent completely. A purified cresol epoxy novolac resin with a hydrolyzable chloride content of 7 ppm was obtained.

EXAMPLE 2

The procedure of Example 1 was employed using the following components and conditions.

100 grams of a cresol-formaldehyde epoxy novolac resin having an average EEW of about 220 and an average epoxide functionality of about 6 and containing 7109 ppm hydrolyzable chloride
100 grams of a 75/25 mixture of MEK/toluene
1.92 grams (1.2 equiv. per hydrolyzable chloride equiv.) of 50% aqueous NaOH.
No cosolvent was employed in the reactions.

Six runs were conducted. Two runs each were conducted at 60°, 70° and 80° C. and the runs were for 1 hour (3600 s) and 2 hours (7200 s). The hydrolyzable chloride content of each of these are given in Table I.

TABLE I

| REACTION TEMP. | HYDROLYZABLE CHLORIDE CONTENT, ppm | |
|---|---|---|
| | AFTER 1 HOUR | AFTER 2 HOURS |
| 60° C. | 54 | 48 |
| 70° C. | 48 | 34 |
| 80° C. | 37 | 19 |

EXAMPLE 3

The procedure of Example 1 was followed using the following components and conditions.
100 grams of a cresol-formaldehyde epoxy novolac resin having an average EEW of 220 and an average functionality of about 6 and containing 1786 ppm hydrolyzable chloride.
100 grams of a 75/25 mixture of MEK/toluene
No cosolvent was employed.

Four runs were made. Two runs were made using 0.52 grams (1.3 equiv. per hydrolyzable chloride equivalent) of 50% aqueous NaOH. One run each was conducted at 80° C. for 1 hour (3600 s) and 2 hours (7200 s). Two runs were made using 0.73 grams (1.3 equiv. per hydrolyzable chloride equiv.) of 50% aqueous KOH. One run each was conducted at 80° C. for 1 hour (3600 s) and 2 hours (7200 s). The results are given in the following Table II.

TABLE II

| ALKALI METAL HYDROXIDE | HYDROLYZABLE CHLORIDE, ppm | |
|---|---|---|
| | 1 HOUR | 2 HOURS |
| NaOH | 38 | 18 |
| KOH | 14 | 8 |

EXAMPLE 4

The procedure of Example 1 was followed employing the following components and conditions.

100 grams of a cresol-formaldehyde epoxy novolac resin having an average EEW of 220 and an average epoxy functionality of 6 and containing 3700 ppm hydrolyzable chloride.
100 grams of a 75/25 mixture of MEK/toluene.
Sufficient quantity of different cosolvents such that the amount of cosolvent was 0.5% by weight based on the epoxy resin.
1 gram (1.2 equiv. per hydrolyzable chlorine equiv.) of a 50% aqueous solution of NaOH The reactions were conducted at 80° C. for 2 hours (7200 s). The results are given in the following Table III.

TABLE III

| COSOLVENT | HYDROLYZABLE CHLORIDE, ppm |
|---|---|
| glycerine | 181 |
| methanol | 95 |
| isopropyl alcohol | 84 |
| monomethyl ether of propylene glycol | 83 |
| tetraethylene glycol | 54 |
| polyethylene glycol (200 MW) | 60 |
| polyethylene glycol (300 MW) | 55 |
| polyethylene glycol (400 MW) | 54 |
| polypropylene glycol (425 MW) | 159 |

EXAMPLE 5

The procedure of Example 1 was followed employing the following components and conditions.
100 grams of a cresol-formaldehyde epoxy novolac resin having an average EEW of 220, an average epoxy functionality of 6 and 3536 ppm hydrolyzable chloride.
100 grams of a 75/25 by weight mixture of MEK/toluene.
Several reactions were conducted at 80° C. for 2 hours (7200 s) employing various quantities of either NaOH or KOH and with and without polyethylene glycol having an average MW of 400. The results are given in the following Table IV.

TABLE IV

| CAUSTIC TYPE | EQUIV. CAUSTIC PER EQUIV. HYDROLYZABLE CHLORIDE | POLY-ETHYL-ENE GLYCOL, wt %* | HYDROLYZ-ABLE CHLORIDE CONTENT, ppm |
| --- | --- | --- | --- |
| NaOH | 1.08 | 0 | 167 |
| NaOH | 1.08 | 0.5 | 107 |
| KOH | 1.08 | 0 | 113 |
| KOH | 1.08 | 0.5 | 48 |
| NaOH | 1.16 | 0.5 | 81 |
| KOH | 1.16 | 0.5 | 33 |
| NaOH | 1.25 | 0.5 | 34 |
| KOH | 1.25 | 0.5 | 7 |

*Based upon weight of epoxy resin.

EXAMPLE 6

To a one liter reaction vessel equipped with temperature and pressure control and indicating means, a means for the continuous addition of aqueous sodium hydroxide, a means for condensing andd separating water from a codistillate mixture of water, solvent and epichlorohydrin and means for returning the solvent and epichlorohydrin was added 118.5 g (1 equivalent) of cresol-formaldehyde novolac resin having an average hydroxyl equivalent wt. of 118.5 and average functionality of about 6, 370 g (4 equivalents) of epichlorohydrin and 247 g of the methylether of propylene glycol (1-methoxy-2-hydroxy propane) as a solvent. After stirring at room temperature and atmospheric pressure to thoroughly mix the contents, the temperature was raised to 65° C. and the pressure was reduced to 180 mm Hg absolute. To the resultant solution was continuously added 75.2 g (0.94 equivalent) of 50% aqueous sodium hydroxide solution at a constant rate over a period of 4 hours (14,400 s). During the addition of the sodium hydroxide, the water was removed by codistilling with epichlorohydrin and solvent. The distillate was condensed thereby forming two distinct phases, an aqueous phase (top) and an organic epichlorohydrin-solvent phase (bottom). The organic phase was continuously returned to the reactor. After completion of the sodium hydroxide addition, the reaction mixture was maintained at a temperature of 65° and a pressure of about 180 mm Hg absolute for an additional 30 minutes (1800 s). The resulting cresol-formaldehyde epoxy novolac resin was then distilled under full vacuum and temperature up to 170° C. to remove all epichlorohydrin and 1-methoxy-2-hydroxy propane.

To the molten cresol-formaldehyde epoxy novolac resin was added an equal weight of a 75/25 by weight mixture of methyl ethyl ketone (MEK) and toluene. A sample of the slurry was taken and was found to contain 1200 ppm hydrolyzable chloride. 0.87 g (0.5 wt.% based on epoxy resin) of polyethylene glycol having an average molecular weight of 400 was added to the mixture and the mixture was heated to 80° C. with stirring. 0.86 g of 50% aqueous potassium hydroxide (1.3 eq. KOH to 1 eq. hydrolyzable chloride) was added all at once and the reaction mixture was maintained at 80° C. for 2 hours (7200 s) with good agitation.

The reaction mixture was diluted to 20% resin concentration with MEK/toluene (75/25) solvent mix, neutralized with $CO_2$ and then washed with water 4 to 5 times to remove NaCl.

The organic phase from the water washes was placed on a rotary evaporator under a full vacuum and temperature of 170° C. to remove the solvent completely. A purified cresol-formaldehyde epoxy novolac resin with a hydrolyzable chloride content of 7 ppm was obtained.

EXAMPLE 7

625 g of cresol epoxy novolac containing 553 ppm hydrolyzable chloride and 930 ppm bound chloride (total chloride=1483 ppm) was dissolved in 625 g of MEK/toluene solvent mix. 1.875 g (0.3 wt.% based on resin) of polyethylene glycol having an average molecular weight of 400 was added to the solution and the solution was heated to 85° C. with stirring. 6.7 g of 45% aqueous potassium hydroxide (2.1 eq. caustic to 1 eq. chlorine) was added all at once and the reaction mixture was maintained at 85° C. for 6 hours (21,600 s) with good agitation.

The reaction mixture was diluted to 20% solid concentration with MEK/toluene solvent mix, neutralized with dilute $H_3PO_4$ and then washed with water several times to remove NaCl.

The organic phase from the washes was placed on a rotary evaporator under a full vacuum and 170° C. to remove the solvent completely. A purified cresol epoxy novolac with hydrolyzable chloride content of 7 ppm and bounded chloride content of 263 ppm (total chloride=270) was obtained.

EXAMPLE 8

100 g of a diglycidyl ether of bisphenol A epoxy resin containing 300 ppm hydrolyzable chloride and 900 ppm bound chloride (total chloride=1200 ppm) was dissolved in 100 g of a MEK/toluene solvent mixture. 0.5 g (0.5 wt.% based on resin) of polyethylene glycol having a molecular weight of 400 was added to the solution and the solution was heated to 80° C. with stirring. 0.84 g of 45% aqueous potassium hydroxide (2 eq. caustic to 1 eq. chlorine) was added all at once and the reaction mixture was maintained at 80° C. for 2 hours (7200 s) with good agitation.

The reaction mixture was diluted to 20% solid concentration with MEK/toluene solvent mixture, neutralized with $CO_2$ and then washed with water several times to remove NaCl.

The organic phase from the washes was placed on a rotary evaporator under a full vacuum and 170° C. to remove the solvent completely. A purified diglycidyl etherr of bisphenol A epoxy resin with hydrolyzable chloride of 3 ppm and bound chloride of 540 ppm (total chloride=543 ppm) was obtained.

EXAMPLE 9

In a stainless steel 2-liter pressure reaction vessel, 625 g of cresol epoxy novolac containing 553 ppm hydrolyzable chloride and 930 ppm bound chloride (total chloride=1483 ppm) was dissolved in 625 g of a 75/25 by weight MEK/toluene solvent mixture. 1.875 g (0.3 wt.% based on resin) of polyethylene glycol having an average molecular weight of 400 was added to the solution and the solution was heated to 120° C. with stirring. 3.9 g of 45% aqueous potassium hydroxide (1.2 eq. caustic to 1 eq. chlorine) was added all at once and the reaction mixture was maintained at 120° C. for 1 hour (3600 s) with good agitation.

The reaction mixture was diluted to 20% solid concentration with MEK/toluene solvent mixture, neutralized with $CO_2$ and then washed with water several times to remove NaCl.

The organic phase from the washes was placed on a rotary evaporator under a full vacuum and 170° C. to remove the solvent completely. A purified cresol epoxy novolac with hydrolyzable chloride content of 8 ppm and bound chloride content of 260 ppm (total chloride=268) was obtained.

We claim:

1. A method for reducing the total halide content of an epoxy resin which method comprises heating said epoxy resin which has been dissolved in a solvent system comprising from about 25 to about 75 percent by weight of a ketone and from 75 to about 25 percent by weight of an aromatic hydrocarbon in the presence of (A) from about 0.1 to about 5 percent by weight based upon the weight of said epoxy resin of at least one cosolvent having at least one aliphatic hydroxyl group per molecule and (B) from about 0.25 to about 10 moles of an alkali metal hydroxide per equivalent of halide at a temperature and for a time sufficient to reduce the total halide content of said epoxy resin and thereafter recovering the resultant epoxy resin.

2. A method of claim 1 wherein
   (i) said solvent system comprises from about 50 to about 75 weight percent of a ketone and from about 50 to about 25 weight percent of an aromatic hydrocarbon;
   (ii) component (A) is present in a quantity of from about 0.2 to about 1 percent by weight of said epoxy resin;
   (iii) component (B) is present in a quantity of from about 1 to about 5 moles per equivalent of total halide; and
   (iv) said heating is conducted at a temperature of from about 60° C. to about 200° C.

3. A method of claim 2 wherein
   (i) said ketone is methyl ethyl ketone or methyl isobutyl ketone;
   (ii) said aromatic hydrocarbon is benzene, toluene or xylene;
   (iii) said cosolvent is a polyoxyethylene glycol having an average molecular weight of from about 100 to about 600;
   (iv) said alkali metal hydroxide is sodium hydroxide or potassium hydroxide;
   (v) said heating is conducted at a temperature of from about 100° C. to about 130° C.; and
   (vi) component (B) is present in a quantity of from about 1 to about 3 moles per equivalent of total halide.

4. A method of claim 3 wherein
   (i) said ketone is methyl ethyl ketone;
   (ii) said aromatic hydrocarbon is toluene;
   (iii) said cosolvent is polyoxyethylene glycol having an average molecular weight of from about 200 to about 400; and
   (iv) said alkali metal hydroxide is potassium hydroxide.

5. A process for reducing the total halide content of an epoxy resin containing hydrolyzable and/or bound halide which process comprises
   (A) dissolving said epoxy resin in a solvent system which comprises
      (1) from about 25 to about 75 percent by weight of at least one ketone and
      (2) from about 75 to about 25 percent by weight of at least one aromatic hydrocarbon;
   (B) adding from about 0.1 to about 5 percent by weight based upon the weight of said epoxy resin of at least one compound having at least one aliphatic hydroxyl group per molecule as a cosolvent;
   (C) heating the resultant solution to a temperature of from about 50° C. up to about 200° C.;
   (D) adding from about 0.25 to about 10 moles of an alkali metal hydroxide per equivalent of total halide;
   (E) continuing the heating for a time sufficient to reduce the total halide content of said epoxy resin;
   (F) washing the product from step (E) with either water, a dilute aqueous solution of a weak inorganic acid, acid salt or a combination thereof; and
   (G) recovering the resultant epoxy resin having a reduced total halide content from the product of step (F).

6. A method of claim 5 wherein
   (i) in step (A) said solvent system comprises from about 50 to about 75 percent by weight of one ketone and said aromatic hydrocarbon is present in quantities of from about 50 to about 25% by weight;
   (ii) in step (B) said cosolvent is present in quantity of from about 0.2 to about 1 weight percent based upon the weight of the epoxy resin;
   (iii) in step (C), said heating is conducted at a temperature of from about 100° C. to about 130° C.; and
   (iv) in step (D), the alkali metal hydroxide is present in a quantity of from about 1 to about 5 moles per equivalent of total halide.

7. A method of claim 6 wherein
   (i) said ketone is methyl ethyl ketone or methyl isobutyl ketone;
   (ii) said aromatic hydrocarbon is benzene, toluene or xylene;
   (iii) said cosolvent is a polyoxyethylene glycol or polyoxypropylene glycol having an average molecular weight of from about 100 to about 600;
   (iv) said alkali metal hydroxide is sodium hydroxide or potassium hydroxide; and
   (v) in step (D), the alkali metal hydroxide is present in a quantity of from about 1 to about 3 moles per equivalent of total halide.

8. A method of claim 7 wherein
   (i) said ketone is methyl ethyl ketone;
   (ii) said aromatic hydrocarbon is toluene;
   (iii) said cosolvent is polyoxyethylene glycol having an average molecular weight of from about 200 to about 400; and
   (iv) said alkali metal hydroxide is potassium hydroxide.

9. A method of claim 8 wherein in step (F), said product from step (E) is washed at least once with a dilute solution of a weak inorganic acid.

10. A method of claim 9 wherein said weak inorganic acid is phosphoric acid or carbonic acid.

* * * * *